(12) United States Patent
Haas et al.

(10) Patent No.: US 9,564,642 B2
(45) Date of Patent: Feb. 7, 2017

(54) DURABLE FUEL CELL WITH PLATINUM COBALT ALLOY CATHODE CATALYST AND SELECTIVELY CONDUCTING ANODE

(71) Applicants: Daimler AG, Stuttgart (DE); Ford Motor Company, Dearborn, MI (US)

(72) Inventors: Herwig Haas, Vancouver (CA); Joy Roberts, Coquitlam (CA); Francine Berretta, Vancouver (CA); Amy Shun-Wen Yang, Port Coquitlam (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 411 days.

(21) Appl. No.: 13/787,849

(22) Filed: Mar. 7, 2013

(65) Prior Publication Data
US 2013/0236812 A1    Sep. 12, 2013

Related U.S. Application Data

(63) Continuation-in-part of application No. 13/417,812, filed on Mar. 12, 2012.

(51) Int. Cl.
*H01M 4/92* (2006.01)
*H01M 4/86* (2006.01)
*H01M 8/10* (2016.01)

(52) U.S. Cl.
CPC .......... *H01M 4/921* (2013.01); *H01M 4/8652* (2013.01); *H01M 4/8673* (2013.01); *H01M 4/92* (2013.01); *H01M 4/926* (2013.01); *H01M 2008/1095* (2013.01)

(58) Field of Classification Search
None
See application file for complete search history.

(56) References Cited

U.S. PATENT DOCUMENTS

| 5,013,617 A | 5/1991 | Scheffler |
| 5,045,414 A | 9/1991 | Bushnell et al. |
| 6,858,336 B2 | 2/2005 | Reiser et al. |
| 6,887,599 B2 | 5/2005 | Reiser et al. |
| 2002/0146616 A1* | 10/2002 | Yasuo et al. ............ 429/44 |

(Continued)

FOREIGN PATENT DOCUMENTS

WO    2011076396 A1    6/2011

OTHER PUBLICATIONS

Gasteiger, A. et al "Activity benchmarks and requirements for Pt, Pt-alloy, and non-Pt oxygen reduction catalysts for PEMFCs" General Motors Corporation, Fuel Cell Activities, Honeoye Falls, NY 14472, USA Applied Catalysis B: Environmental 56 (2005) 9-35 © 2004 Elsevier.

(Continued)

*Primary Examiner* — Miriam Stagg
*Assistant Examiner* — Wojciech Haske
(74) *Attorney, Agent, or Firm* — Patent Central LLC; Stephan A. Pendorf

(57) ABSTRACT

The degradation associated with repeated startup and shutdown of solid polymer electrolyte fuel cells comprising PtCo alloy cathode catalysts can be particularly poor. However, a marked and unexpected improvement in durability is observed as a result of incorporating a selectively conducting component in electrical series with the anode components in the fuel cell.

12 Claims, 3 Drawing Sheets

(56) References Cited

U.S. PATENT DOCUMENTS

| | | | |
|---|---|---|---|
| 2006/0002844 A1* | 1/2006 | Suenaga | B82Y 30/00 423/447.3 |
| 2007/0003823 A1* | 1/2007 | Mei et al. | 429/44 |
| 2008/0292931 A1* | 11/2008 | Schwartz et al. | 429/27 |
| 2010/0285397 A1* | 11/2010 | Lin et al. | 429/528 |

OTHER PUBLICATIONS

Matsutani, K et al "Effect of Particle Size of Platinum and Platinum-Cobalt Catalysts on Stability Against Load Cycling" Tanaka Kikinzoku KK, Technical Centre, 2-73 Shinmachi, Hiratsuka, Kanagawa 254-0076, Japan Platinum Metals Rev., 2010, 54 (4), 223-232 http://www.platinummetalsreview.com/.

* cited by examiner

DURABLE FUEL CELL WITH PLATINUM COBALT ALLOY CATHODE CATALYST AND SELECTIVELY CONDUCTING ANODE

BACKGROUND

Field of the Invention

The present invention pertains to fuel cells, particularly to solid polymer electrolyte fuel cells, and to components and constructions for improving both performance and durability.

Description of the Related Art

Sustained research and development effort continues to be devoted to fuel cells because of the energy efficiency and environmental benefits they can potentially provide. Solid polymer electrolyte fuel cells are particularly suitable for consideration as power supplies in traction applications, e.g. automotive. However, improvements in catalyst technology for cost reduction purposes and in durability after repeated exposure to startup and shutdown remain challenges for automotive applications in particular.

The catalysts in such fuel cells are used to enhance the rate of the electrochemical reactions which occur at the cell electrodes. Catalysts based on noble metals such as platinum are typically required in order to achieve acceptable reaction rates, particularly at the cathode side of the cell. To achieve the greatest catalytic activity per unit weight, the noble metal is generally disposed on a corrosion resistant support with an extremely high surface area, e.g. high surface area carbon particles. However, noble metal catalyst materials are relatively quite expensive. In order to make fuel cells economically viable for automotive and other applications, there is a need to reduce the amount of noble metal (the loading) used in such cells, while still maintaining similar power densities and efficiencies. This can be quite challenging.

One approach considered in the art is the use of certain noble metal alloys which have demonstrated enhanced activity over the noble metals per se. For instance, alloys of Pt with base metals such as Co have demonstrated circa two-fold activity increases for the oxygen reduction reaction taking place at the cathode in the kinetic operating region (amounting to about a 20-40 mV gain). However, despite this kinetic advantage, such catalyst compositions can suffer from relatively poor performance in the mass transport operating regime (i.e. at high power or high current densities). Some of the advantages and disadvantages of such alloys as cathode catalysts are discussed for instance in "Effect of Particle Size of Platinum and Platinum-Cobalt Catalysts on Stability"; K. Matsutani et al., Platinum Metals Rev., 54 (4) 223-232 and "Activity benchmarks and requirements for Pt, Pt-alloy, and non-Pt oxygen reduction catalysts for PEMFCs", H. Gasteiger et al., Applied Catalysis B: Environmental 56 (2005) 9-35.

Unacceptably high degradation rates in performance can also be an issue in solid polymer electrolyte fuel cells subjected to repeated startup and shutdown cycles. The degradation can be further exacerbated when using low catalyst loadings in the electrodes for cost saving purposes. Often, there is a trade-off between durability and performance in the fuel cell. During the startup and shut-down of fuel cell systems, corrosion enhancing events can occur. In particular, air can be present at the anode at such times (either deliberately or as a result of leakage) and the transition between air and fuel in the anode is known to cause temporary high potentials at the cathode, thereby resulting in carbon corrosion and platinum catalyst dissolution. Such temporary high cathode potentials can lead to significant performance degradation over time. It has been observed that the lower the catalyst loading, the faster the performance degradation. The industry needs to either find more stable and robust catalyst and cathode materials or find other means to address the performance degradation.

A number of approaches for solving the degradation problem arising during startup and shutdown have been suggested in the art. For example, the problem has been addressed by employing higher catalyst loadings, valves around the stack to prevent air ingress into the anode during storage, and using carefully engineered shutdown strategies. Some suggested systems incorporate an inert nitrogen purge and nitrogen/oxygen purges to avoid damaging gas combinations being present during these transitions. See for example U.S. Pat. No. 5,013,617 and U.S. Pat. No. 5,045,414.

Some other concepts involve fuel cell stack startup strategies involving fast flows to minimize potential spikes. For example, U.S. Pat. No. 6,858,336 and U.S. Pat. No. 6,887,599 disclose disconnecting a fuel cell system from its primary load and rapidly purging the anode with air on shutdown and with hydrogen gas on startup respectively in order to reduce the degradation that can otherwise occur. While this can eliminate the need to purge with an inert gas, the methods disclosed still involve additional steps in shutdown and startup that could potentially cause complications. Shutdown and startup can thus require additional time and extra hardware is needed in order to conduct these procedures.

Recently, in PCT patent application serial number WO2011/076396 by the same applicant which is hereby incorporated by reference in its entirety, it was disclosed that the degradation of a solid polymer fuel cell during startup and shutdown can be reduced by incorporating a suitable selectively conducting component in electrical series with the anode components in the fuel cell. The component is characterized by a low electrical resistance in the presence of hydrogen or fuel and a high resistance in the presence of air (e.g. more than 100 times lower in the presence of hydrogen than in the presence of air).

Some catalyst materials are especially vulnerable to such degradation, perhaps due to the catalyst composition employed and/or the nature of the carbon support employed. For instance, PtCo alloy cathode catalyst and/or carbon supported PtCo cathode catalyst may be particularly vulnerable. While a substantial improvement in durability may be expected by incorporating a selectively conducting anode component in such fuel cells, it may nonetheless be expected to be inadequate for practical applications if the cathode catalyst is too vulnerable to such degradation.

For such reasons, alloy catalyst compositions, such as PtCo, are presently considered predominantly for stationary applications and are less attractive for automotive applications which require higher power density.

SUMMARY

Although solid polymer electrolyte fuel cells of conventional construction based on PtCo alloy cathode catalysts were found to be particularly vulnerable to startup/shutdown related degradation, a marked and unexpected improvement in durability, e.g. up to an order of magnitude, was observed as a result of incorporating a selectively conducting component in electrical series with the anode components therein.

The improved solid polymer electrolyte fuel cell comprises a solid polymer electrolyte, a cathode, and anode components connected in series electrically wherein 1) the cathode comprises a PtCo alloy catalyst and 2) the anode components comprise an anode and a selectively conducting component as described in the aforementioned WO2011/076396. Specifically then, the selectively conducting component comprises a selectively conducting material, and the electrical resistance of the selectively conducting component in the presence of hydrogen is more than 100 times lower, and preferably more than 1000 times lower, than the electrical resistance in the presence of air.

In particular, the cathode catalyst may be a carbon supported PtCo alloy catalyst comprising 25-30%, preferably 27-29%, most preferably 27.5-28.5% Pt and 2-6%, preferably 3-5, most preferably 3.5-4.5%, and in one particular embodiment, about 28% Pt and 4% Co by weight. And the selectively conducting material may be tin oxide, additionally comprising platinum (e.g. 0.5 to 2%, preferably 0.75 to 1.5, most preferably about 1% by weight) deposited on the tin oxide. This selectively conducting material can be incorporated as a layer on the side of an anode gas diffusion layer adjacent the anode in a thickness from about 15 to 20 micrometers thick.

The invention is particularly suitable for use in fuel cell systems which will be subjected to numerous startup and shutdown sequences over the lifetime of the system (e.g. over 1000) because the accumulated effects of degradation will be much more substantial. For instance, the invention is particularly suitable for automotive applications in which the fuel cell system is the traction power supply for the vehicle.

DETAILED DESCRIPTION

Fuel cells of the invention comprise cathode catalysts based on PtCo alloys and a selectively conducting anode component as disclosed in the aforementioned PCT application WO2011/076396. The fuel cells enjoy many of the advantages associated with PtCo alloy cathodes while also enjoying an unexpectedly substantial improvement in degradation associated with startup and shutdown cycling.

Figure 1:
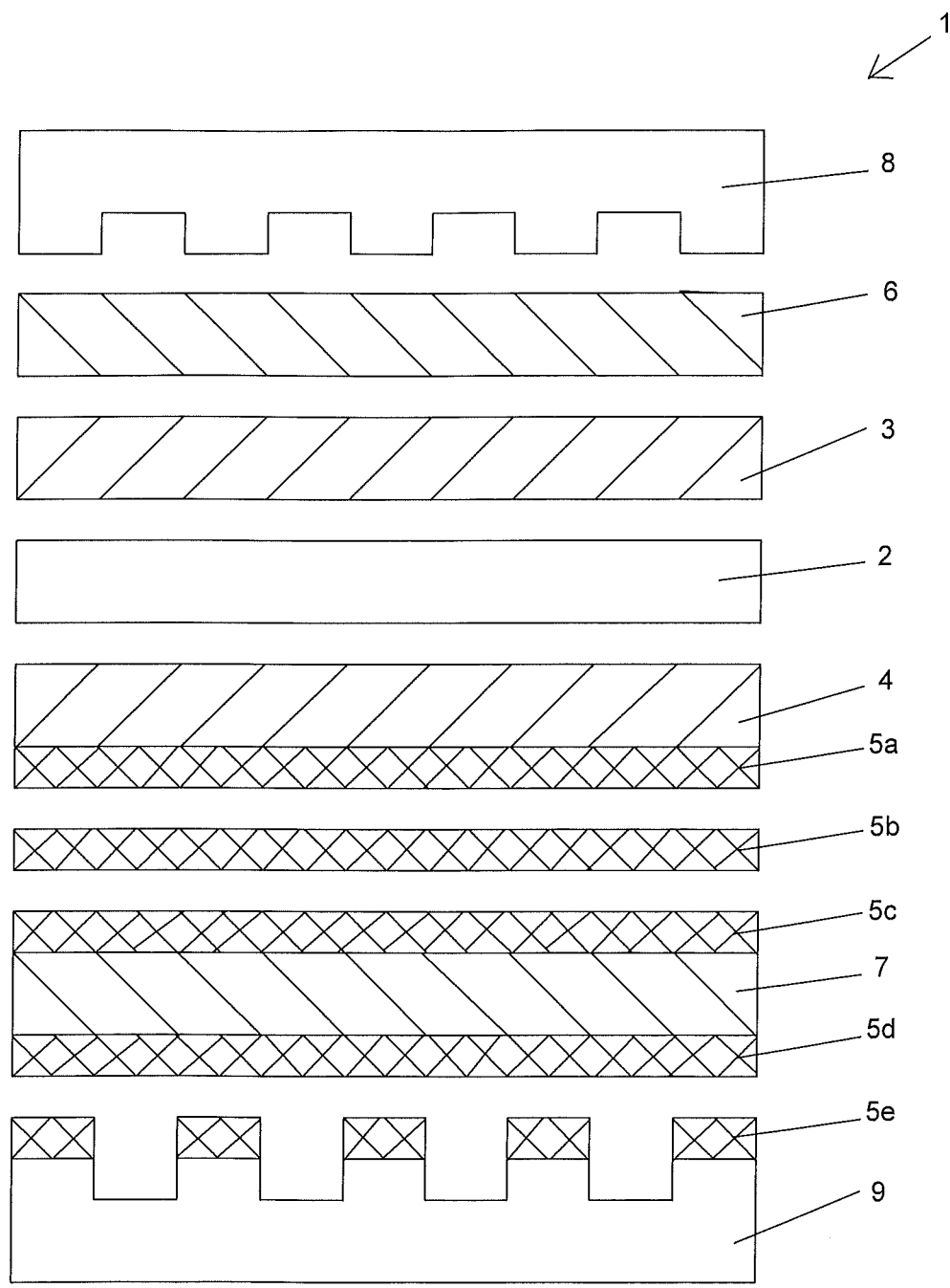
FIG. 1 shows a schematic exploded view of the various components making up a prior art unit cell for a solid polymer electrolyte fuel cell comprising a selectively conducting anode component.

Except for the choice of cathode catalyst and the presence of the selectively conducting anode component, the construction of the fuel cell, and stacks thereof, can be any of the conventional constructions known to those in the art. FIG. 1 (excerpted from WO2011/076396) shows an exploded schematic view of the various components making up a unit cell for a typical solid polymer electrolyte fuel cell stack along with some of the possible locations in which a selectively conducting anode component might be incorporated. Unit cell 1 comprises a solid polymer electrolyte 2, cathode 3, and anode 4. Adjacent the two cathode and anode electrodes are cathode GDL 6 and anode GDL 7 respectively. Adjacent these two GDLs are cathode flow field plate 8 and anode flow field plate 9.

In the instant invention however, cathode 3 comprises PtCo alloy catalyst, and preferably a supported PtCo alloy catalyst.

The selectively conducting component is incorporated in electrical series with the anode components. As shown in FIG. 1, this selectively conducting component can be incorporated in one of the existing anode components or alternatively as a separate discrete layer. For instance, the selectively conducting component can be any of the following: layer 5a which forms part of anode 4, layer 5c or 5d which form part of anode GDL 7, 5e which forms part of flow field plate 9, or even a discrete layer such as discrete layer 5b (which may optionally be located between anode GDL 7 and anode flow field plate 9 instead of between anode 4 and anode GDL 7 as shown in FIG. 1).

Materials useful as the selectively conducting material are primarily metal oxides such as tin oxide which are known to become more electrically conductive with a conduction path being created by an oxygen deficient structure at the surface in the presence of hydrogen, and which convert to a stoichiometric state and become non-conductive in the presence of oxygen.

For instance, as illustrated in the Examples below, a marked improvement in durability can be obtained using tin oxide, $SnO_2$, with an amount of noble metal, Pt, associated therewith (e.g. deposited on) as the selectively conducting material.

Alternative material choices, alternative methods for incorporating noble metals on the metal oxide, methods for making appropriate dispersions for coating such layers and for performing the coating, optional configurations for the selectively conducting layer, and other engineering considerations are discussed in detail in WO2011/076396 and may be considered here.

Without being bound by theory, it is believed that PtCo alloy catalysts may better catalyse the undesirable carbon corrosion reactions occurring during startup/shutdown and hence fuel cells comprising such catalyst in their cathodes may be particularly prone to corrosion. In turn, the benefits of incorporating a selectively conducting component in the anode may then be more pronounced.

The following Examples have been included to illustrate certain aspects of the invention but should not be construed as limiting in any way.

EXAMPLES

A series of experimental fuel cells was prepared and then subjected to accelerated startup/shutdown cycle testing to compare the durability characteristics of the cells in the series. The series included several comparative fuel cells, specifically: conventional carbon supported platinum cathode and anode catalyst based cells, both with and without a selectively conducting component in the anode; carbon supported platinum cathode catalyst and special NSTF (nanostructured thin film catalyst product of 3M Inc.) anode catalyst based cells, both with and without a selectively conducting component in the anode; and also a PtCo cathode catalyst and conventional carbon supported platinum anode catalyst based cell without any selectively conducting component in the anode. The series also included a fuel cell of the invention having a similar PtCo cathode catalyst and conventional anode catalyst but with a selectively conducting component in the anode.

The cells all comprised catalyst coated membrane electrolytes (CCMs) sandwiched between anode and cathode gas diffusion layers (GDLs) made of commercial carbon fibre paper from Freudenberg. The CCMs all had membrane electrolytes made of 10 micrometer thick perfluorosulfonic acid ionomer which had been coated on opposite sides with the desired anode and cathode catalyst layers. The catalyst used in the conventional carbon supported platinum (Pt/C) cathode and anode catalyst layers was a commercial product comprising about 46% Pt by weight. Each coated catalyst layer comprised about 0.25 mg/cm$^2$ of Pt. The PtCo alloy cathode catalyst used was also supported on carbon and was also commercially obtained. The carbon supported PtCo alloy catalyst composition comprised about 29% Pt and 4.3% Co by weight. The total Pt loading in these cathode catalyst layers was also about 0.25 mg/cm$^2$ of Pt. The NSTF anode catalyst used in the indicated anodes is described in U.S. Pat. No. 7,622,217 and was obtained from 3M Inc. The loading here was also about 0.25 mg/cm$^2$ of Pt.

The selectively conducting component used in the indicated experimental cells was a layer comprising a proprietary 1% Pt—SnO$_2$ composition obtained from a commercial supplier in which the Pt was deposited on the SnO$_2$. These selectively conducting oxide layers (SOx layers) were provided where indicated as coatings on the side of the anode GDLs facing the anode catalyst layers (i.e. as layer 5c shown in FIG. 1). The coatings were applied using a solid-liquid ink dispersion comprising a mixture of the Pt—SnO$_2$, METHOCEL™ methylcellulose polymer, distilled water, and isopropyl alcohol. PTFE was included as a binder in the dispersions. The dispersions were then applied, dried, and sintered as described in the aforementioned PCT patent application WO2011/076396. The thickness of the selectively conducting anode layer applied was in the range from about 15-20 micrometers.

Assemblies comprising the appropriate CCM and anode and cathode GDLs were then bonded together under elevated temperature and pressure and placed between appropriate cathode and anode flow field plates to complete the experimental fuel cell constructions.

Table 1 below summarizes the key features in each example fuel cell.

TABLE 1

| Test cell ID | Cathode catalyst | Anode catalyst | Selectively conductive oxide anode layer present? |
|---|---|---|---|
| Conventional | Pt/C | Pt/C | No |
| SOx | Pt/C | Pt/C | Yes |
| NSTF | Pt/C | NSTF | No |
| NSTF + SOx | Pt/C | NSTF | Yes |
| PtCo | PtCo alloy | Pt/C | No |
| PtCo + SOx | PtCo alloy | Pt/C | Yes |

The cells were then subjected to accelerated startup/shutdown testing to determine how each type of cell degraded over time. The test procedure involved operating the cells at a current density of 1.5 A/cm$^2$ using hydrogen and air reactants at 68° C. and 70% RH and repeatedly subjecting them to startup/shutdown cycles designed to accelerate degradation. The cycling comprised reducing the electrical load to draw 0.7 A/cm$^2$ while maintaining the flow of reactants for 10 seconds, increasing the load for 30 seconds to draw 1.5 A/cm$^2$, allowing the cells to sit at open circuit for 1 second, then purging both anode and cathode with air for 19 seconds, then returning the flow of reactants and allowing the cells to sit at open circuit again for 5 seconds, and repeating.

The voltage output of each cell was recorded after each startup/shutdown cycle. The cells did not exhibit any voltage instability during testing.

Figure 2:
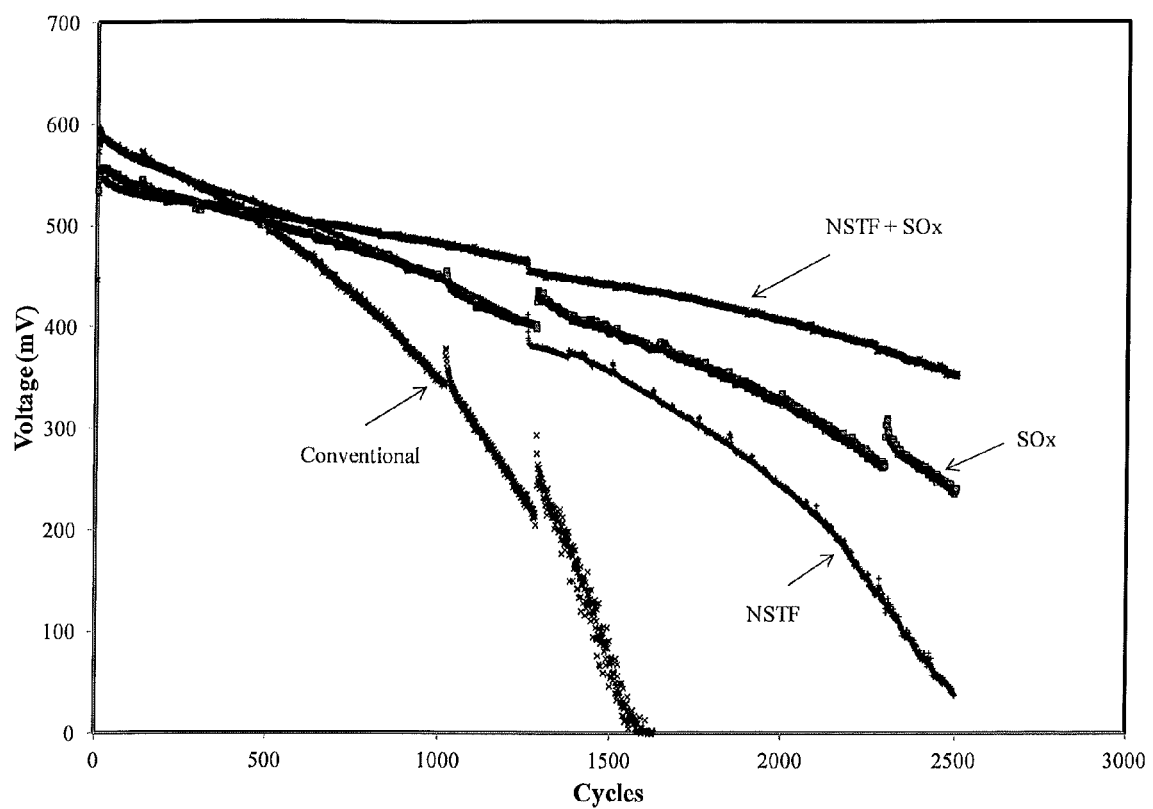
FIG. 2 compares plots of voltage versus number of startup/shutdown cycles for various comparative fuel cells in the Examples and illustrates the benefits of incorporating a selectively conducting anode component in various fuel cell embodiments.

FIG. 2 compares plots of output voltage at 1.5 A/cm$^2$ versus number of startup/shutdown cycles for the comparative Conventional, SOx, NSTF, and NSTF+SOx cells tested here. The Conventional cell showed the fastest degradation in voltage with startup/shutdown cycle number. After about 1500 startup/shutdown cycles, the output voltage of the Conventional cell had dropped to almost zero. In accordance with the teachings of WO2011/076396, the SOx cell however performed much better and only dropped to about half its starting output voltage capability after about 2000 cycles.

The NSTF anode cell was also observed to perform much better than the Conventional cell in this accelerated durability testing and only dropped to about half its starting output voltage capability after about 1700 cycles. With this improved result in mind, as might be expected in view of the teachings of WO2011/076396, the NSTF+SOx cell performed better still and had not dropped to half its initial output capability even after 2500 cycles. Nonetheless, significant degradation had occurred after so many cycles.

Figure 3:
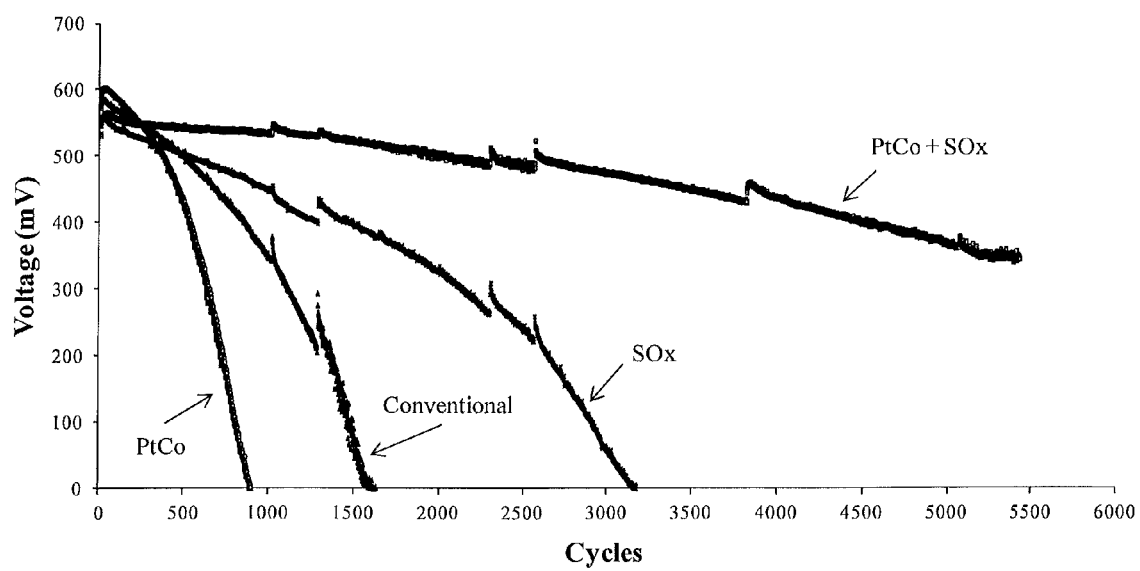
FIG. 3 compares plots of voltage versus number of startup/shutdown cycles for the inventive fuel cell and several comparative fuel cells in the Examples and illustrates the unexpectedly large improvement in durability observed for the inventive PtCo alloy cathode based fuel cell employing a selectively conducting anode component.

FIG. 3 however compares plots of output voltage at 1.5 A/cm$^2$ versus number of startup/shutdown cycles for the comparative Conventional, SOx, and PtCo cells along with the PtCo+SOx cell of the invention. The Conventional and SOx cell plots are the same as those shown in FIG. 2 and are provided for ease of comparison. The PtCo cathode cell showed the fastest degradation in voltage of all the cells in the series. After only about 800 startup/shutdown cycles, the output voltage of the PtCo cell had dropped to almost zero. Thus, while an improvement in degradation might be expected from the PtCo+SOx cell, one would still expect the degradation to be worse than that of the SOx cell. However, the results seen from the PtCo+SOx cell were markedly and unexpectedly better. They were not only better than that seen in the SOx cell, but were markedly better than that seen in the improved NSTF+SOx cell. The PtCo+SOx cell had not dropped to about half its starting output voltage capability after 5000 cycles.

These examples clearly show the marked, unexpectedly superior durability characteristics of cells combining the use of PtCo alloy catalyst at the cathode with use of a selectively conducting anode layer at the anode.

A series of four fuel cell stacks, each comprising 20 cells in series, was then prepared that were the stack equivalents of the test cells having ID: Conventional, SOx, PtCo, and PtCo+SOx of Table 1. These stacks were subjected to similar accelerated startup/shutdown testing as the aforementioned test cells to see how each stack degraded over time. In each case, the average cell voltage was recorded as a function of startup/shutdown cycles.

The average cell voltage of the stack comprising Conventional cells started cycling at about 700 mV but fell to about 375 mV after 500 cycles. The stack comprising PtCo cells started cycling at about 725 mV but fell to about 375 mV after 700 cycles. However, the stack comprising SOx cells started cycling at about 690 mV and maintained a high average voltage of about 575 mV for 1600 cycles. And the stack comprising PtCo+SOx cells performed similarly well, also starting at about 690 mV and maintained a high average voltage of about 575 mV for 1500 cycles.

These examples show that the superior durability characteristics of the invention can readily be obtained in fuel cell stacks as well as single cells.

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. For instance, the invention is not limited just to fuel cells operating on pure hydrogen fuel but also to fuel cells operating on any hydrogen containing fuel or fuels containing hydrogen and different contaminants, such as reformate which contains CO and methanol. Such modifications are to be considered within the purview and scope of the claims appended hereto.

What is claimed is:

1. A solid polymer electrolyte hydrogen/air fuel cell comprising a solid polymer electrolyte, a cathode side comprising a cathode, and an anode side comprising an anode and a selectively conducting metal oxide layer connected in series electrically wherein:
    the selectively conducting metal oxide layer is characterized by a low electrical resistance in the presence of hydrogen or fuel and a high electrical resistance in the presence of air;
    the electrical resistance of the selectively conducting metal oxide layer in the presence of hydrogen is more than 100 times lower than the electrical resistance in the presence of air;
    the cathode comprises a carbon supported PtCo alloy catalyst comprising 25-30% Pt and 2-6% Co by weight;
    the selectively conducting metal oxide is tin oxide (SnO, $SnO_2$) in the form of particles with platinum deposited on the tin oxide particles.

2. The fuel cell of claim 1 wherein the electrical resistance of the selectively conducting metal oxide layer in the presence of hydrogen is more than 1000 times lower than the electrical resistance in the presence of air.

3. The fuel cell of claim 1 wherein the selectively conducting material comprises 0.5 to 2% by weight of platinum deposited on the tin oxide particles.

4. The fuel cell of claim 1 wherein the anode side comprises an anode gas diffusion layer, and wherein
    the selectively conducting metal oxide layer is the anode gas diffusion layer, or
    the selectively conducting metal oxide layer is incorporated as a layer on the side of an anode gas diffusion layer adjacent the anode.

5. The fuel cell of claim 4 wherein the selectively conducting metal oxide layer is from about 15 to about 20 micrometers thick.

6. The fuel cell of claim 1 wherein the carbon supported PtCo alloy catalyst comprises 27-29% Pt and 3-5% Co by weight.

7. The fuel cell of claim 1 wherein the selectively conducting material comprises 0.75 to 1.5% by weight of platinum deposited on the tin oxide particles.

8. A method for reducing degradation of a solid polymer electrolyte hydrogen/air fuel cell comprising a solid polymer electrolyte, a cathode comprising a carbon supported PtCo alloy catalyst comprising 25-30% Pt and 2-6% Co by weight, and an anode, the method comprising:
    incorporating a selectively conducting metal oxide layer in electrical series with the anode wherein the selectively conducting metal oxide layer comprises a selectively conducting material characterized by a low electrical resistance in the presence of hydrogen or fuel and a high electrical resistance in the presence of air, and the electrical resistance of the selectively conducting metal oxide layer in the presence of hydrogen is more than 100 times lower than the electrical resistance in the presence of air,
    wherein the selectively conducting metal oxide is tin oxide (SnO, $SnO_2$) in the form of particles with 0.5 to 2 by weight of platinum deposited on the tin oxide particles.

9. The method of claim 8 wherein the cathode comprises a carbon supported PtCo alloy catalyst.

10. The method of claim 8, further comprising providing an anode gas diffusion layer, and providing the selectively conducting material as a layer on the side of the anode gas diffusion layer adjacent the anode.

11. The method of claim 8 wherein the selectively conducting material comprises 0.75 to 1.5% by weight of platinum deposited on the tin oxide particles.

12. A vehicle comprising a traction power supply comprising a solid polymer electrolyte hydro gen/air fuel cell comprising a solid polymer electrolyte, a cathode side comprising a cathode, and an anode side comprising an anode and a selectively conducting metal oxide layer connected in series electrically wherein:
    the selectively conducting metal oxide layer is characterized by a low electrical resistance in the presence of hydrogen or fuel and a high electrical resistance in the presence of air;
    the electrical resistance of the selectively conducting metal oxide layer in the presence of hydrogen is more than 100 times lower than the electrical resistance in the presence of air; the cathode comprises a PtCo alloy catalyst;
    the selectively conducting metal oxide is selected from tin oxide (SnO, $SnO_2$) in the form of particles with platinum deposited on the tin oxide particles.

\* \* \* \* \*